United States Patent [19]

Brum

[11] Patent Number: 5,102,063

[45] Date of Patent: * Apr. 7, 1992

[54] AERODYNAMICALLY BRAKED TOWED VEHICLE DEPLOYMENT DEVICE

[75] Inventor: Roger D. Brum, Irvine, Calif.

[73] Assignee: Southwest Aerospace Corporation, Tustin, Calif.

[*] Notice: The portion of the term of this patent subsequent to Mar. 10, 2009 has been disclaimed.

[21] Appl. No.: 675,451

[22] Filed: Mar. 26, 1991

[51] Int. Cl.⁵ ............................................. B64D 3/02
[52] U.S. Cl. ............................ 244/1 TD; 244/138 R; 244/152; 114/247; 114/253; 182/239; 273/360
[58] Field of Search ............ 244/1 TD, 3, 142, 138 R, 244/152, 151 R, 110 A, 110 D; 114/242, 244, 245, 247, 253, 254; 441/24, 25, 26; 182/236, 237, 238, 239, 73; 242/100.1, 99; 188/270, 185; 258/1.2, 1.4, 1.6, 1.8; 273/360, 361

[56] References Cited

U.S. PATENT DOCUMENTS

| 715,691 | 12/1902 | Porter, Jr. | 182/239 |
|---|---|---|---|
| 1,206,676 | 11/1916 | Cote | 182/239 |
| 1,531,926 | 3/1925 | Hallof | 188/185 |
| 2,119,550 | 6/1938 | Loughridge | 188/270 |
| 2,156,294 | 5/1939 | Kessenich | 244/138 R |
| 2,396,071 | 3/1946 | Anderson et al. | 258/1.2 |
| 2,486,999 | 11/1949 | Tapp et al. | 258/1.2 |
| 2,967,683 | 1/1961 | Crater | 244/110 A |
| 4,029,298 | 6/1977 | Lassche | 182/238 |
| 4,416,429 | 11/1983 | Jessamine | 242/100.1 |
| 4,469,196 | 9/1984 | Sadler | 188/270 |

Primary Examiner—Galen L. Barefoot
Attorney, Agent, or Firm—Stetina and Brunda

[57] ABSTRACT

This invention relates to an aerodynamically braked vehicle deployment device. The deployment device system generally comprises a spool member. A tow line is bifilar wound about the spool member in a manner wherein one end of the tow line is attached to an aircraft while the other end is attached to a towed vehicle. The towed vehicle and the deployment device are deployed simultaneously, and the spool, by nature of its bifilar winding, assumes a position between the aircraft and the towed vehicle. An aerodynamic braking means is interfaced to the spool in a manner operable to provide a braking force during payout of the towed vehicle to control the payout speed of the towed vehicle. At the end of the towed vehicle payout, the deployment device is adapted to disengage itself from the tow line and propel itself away from the tow line and clear of the towed vehicle.

15 Claims, 2 Drawing Sheets

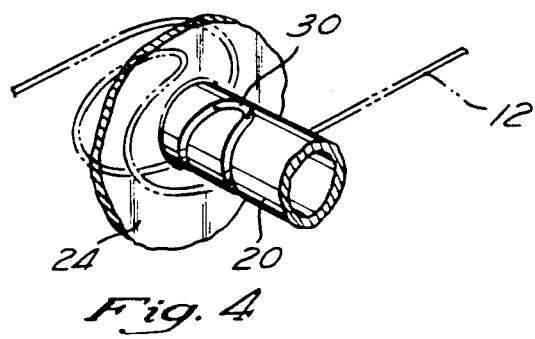
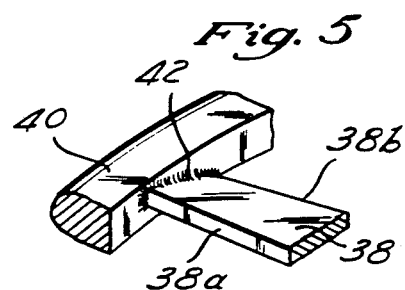
Fig. 4
Fig. 5
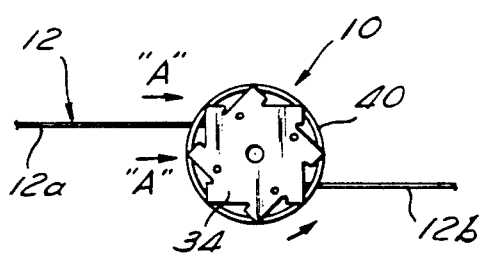
Fig. 6
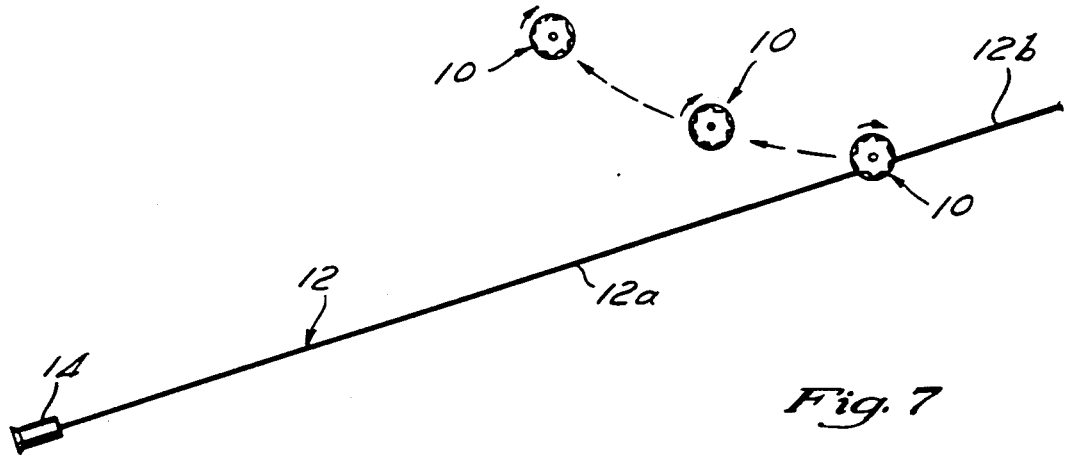
Fig. 7

AERODYNAMICALLY BRAKED TOWED VEHICLE DEPLOYMENT DEVICE

FIELD OF THE INVENTION

The present invention relates generally to towed vehicles such as aerial targets and decoys and more particularly to an aerodynamically braked towed vehicle deployment device used to deploy such towed vehicles behind military aircraft.

BACKGROUND OF THE INVENTION

In military applications, two types of towed vehicles are well-known and often used for weapon gunnery practice and aircraft protection. These are aerial towed targets and aerial towed decoys, respectively. Aerial towed targets are typically towed behind an aircraft and used in conjunction with pilot weapon training exercises. Aerial towed decoys are typically used to draw various types of guided weapons away from an aircraft that the weapons are intended to destroy and/or used to evaluate effectiveness of guided weapon systems. Examples of an aerial target and aerial decoy are shown in United States Letters Patent Nos. 4,205,848 to Smith et al. and 4,852,455 to Brum, respectively.

Both aerial towed targets and decoys typically include electronic devices and circuitry incorporated therein. In this respect, aerial towed targets include various electronic devices which are used for purposes of scoring the pilot's performance during a training exercise. The decoys contain various types of electronic circuits which are operable to create an apparent target to a weapon to attract the weapon to the decoy, rather than the aircraft. One such electronic device is a transponder which is adapted to receive radar signals and re-broadcast an amplified return signal. The transponder is designed to present a larger electronic target than the aircraft from which it is deployed and thereby attract the weapon away from the aircraft.

In those deployment systems in which the towed vehicle is electrically interfaced to the aircraft, the electronic data transmission between the towed vehicle and aircraft is typically facilitated via the tow line used to interconnect the towed vehicle to the aircraft. Data transmitting tow lines as currently utilized generally comprise a core of standard conducting material extending throughout the tow line forming an electrical communication line between the towed vehicle and the aircraft. As the programming of anti-aircraft weaponry becomes more sophisticated to better discriminate between decoys and aircraft, the need to provide decoys within enhanced electrical capabilities similarly evolves. Additionally, as fighter weaponry becomes more advanced, it is likewise necessary to supply targets with enhanced data transmission and receiving capabilities. Thus, it is increasingly necessary for the tow line to transmit greater amounts of data and to conduct such transmission at a faster rate.

Further electrical conducting materials as currently utilized in data transmitting tow lines are highly susceptible to RF (radio frequency) interference which diminishes the data transfer capability of the tow line. It has been found that the shortcomings of conventionally known data transmitting tow lines can be overcome through the use of a tow line having a fiber optic core to establish the communications link between the aircraft and the towed vehicle. Such a fiber optic link has the advantage of providing enhanced data transmission rates as well as eliminating susceptibility to RF interference.

Though some aerial towed targets as currently manufactured are intended to be sacrificial, i.e. non-recoverable, others are intended to be recoverable. As can be appreciated, decoys by their very nature are intended to be sacrificial only, i.e. the tow line is cut at the aircraft at the end of a flight or mission. Though decoys and certain varieties of aerial towed targets are sacrificial, the need for rapid and reliable data exchange between these towed vehicles and the aircraft is of utmost importance for the reasons as previously discussed.

With regard to both recoverable and sacrificial towed vehicles, perhaps the most critical stage in the utilization of such towed vehicles lies in their initial deployment. The difficulty regarding deployment lies in the fact that the tow line must be able to withstand the extreme amount of tensile force exerted thereon by the drag of the vehicle and the rapid deceleration at the end of the payout of the vehicle. In one currently known deployment technique, the tow line is wrapped or folded at either the aircraft end or the towed vehicle end and allowed to pay out freely without braking. This particular deployment technique is primarily used in conjunction with sacrificial towed vehicles. In using this particular technique, the elasticity of the tow line must absorb the kinetic energy arising from the relative velocity of the towed vehicle to the aircraft at the end of the towed vehicle payout. As can be appreciated, oftentimes the tow line will snap during deployment, rendering the towed target or decoy irretrievably lost. Additionally, this particular deployment technique is only effective at relatively low aircraft speeds since at higher aircraft speeds, the mass of the tow line itself prevents full use of its elasticity which typically results in line failure at the end of the payout. Additionally, this particular technique does not lend itself to the transmission of power and electronic information through the tow line, the importance of which has been previously discussed. Since the tow line must possess such a high degree of elasticity so as not to snap, the line itself will typically cause the conductors within it to fail when it stretches. Thus, a tow line having a fiber optic core could not be used since the tow line elasticity would cause a failure of the fiber optics when the vehicle is deployed.

A second technique of deploying both sacrificial and recoverable towed vehicles involves the fixing of spools at either the aircraft or the towed vehicle to control the payout and braking of the tow line. In this respect, the tow line is wrapped about the spool and allowed to be payed out in a controlled manner. An example of a first deployment system which is operated in this manner and intended to be used in conjunction with sacrificial towed vehicles (i.e. decoys) is shown in United States Letters Patent No. 4,852,455 to Brum. In this particular system, the decoy is initially stored within a canister which is permanently attached to the aircraft. The canister includes a spool rotatably connected thereto about which the tow line is wound. The decoy is released from the canister via an explosive charge, and payed out behind the aircraft through the rotation of the spool. Centrifugal brakes are provided within the canister to oppose the rotation of the spool and thereby regulate the reeling payout speed of the deployed tow line. The tow line is adapted to communicate electrical signals to the decoy to regulate the operation of the electrical circuitry disposed therein. Electrical signals which are intended to be passed to the decoy through the tow line are communicated to the canister via one or more pin connectors. The pin connectors are interfaced to complimentary dynamic slip rings which are interfaced to the spool and tow line in a manner operable to transfer the electrical signals from the aircraft to the tow line and hence the decoy.

A second type of deployment system which utilizes the second technique and is used primarily with recoverable aerial targets comprises a bi-directional reeling machine. Examples of such reeling machines are shown in United States Letters Patent Nos. 4,770,368 to Yates et al.; 2,760,777 to Cotton; 2,778,584 to Wilson; 2,892,599 to Baldwin et al.; and 2,751,167 to Hopper. Such reeling machines typically utilize electric motors, as well as other types of supplementary power devices and brakes which are interfaced to a spool in a manner operable to reel equipment in and out from an aircraft. Additionally, some of these reeling machines are powered by means of an air driven turbine interfaced to a spool which can take advantage of the available power produced by the ram air energy impinging upon the device during aircraft flights. The aforementioned references all comprises reeling systems which are adapted to be permanently affixed to the aircraft. With regard to the paying out of the towed vehicle, the Cotton, Wilson and Baldwin references all disclose fixed pitch turbine blade design concepts with various means of throttling the air mass flow through the turbine in order to solely control the reel in rate and not the reel out rate of the towed vehicle. In this respect, Cotton controls reeler payout by means of a motor applied friction brake while Wilson and Baldwin rely upon centrifugally applied friction brakes to control reel out rate or speed which function in a manner substantially identical to that as previously discussed with respect to the Brum reference. The Hopper reference discloses a variable pitch turbine in which the blades of the turbine may be rotated to various attack angles to provide torque for reel in or provide opposing torque for reel out applications. However, this variable pitch turbine blade design is extremely expensive and requires constant operator monitoring of turbine speed and hence, has not been widely utilized in the prior art. The alternative disclosed in Hopper, i.e. having a fixed pitch turbine coupled to a reversing gear train to achieve reel in, reel out bi-directional operation give rise to the complexity of a reversing gear train which has likewise prevented the design's widespread use.

It will be appreciated that the aforementioned bidirectional reeling devices adapted to reel in and reel out towed vehicles are generally not used in conjunction with sacrificial vehicles in that there is typically no need to reel in a sacrificial vehicle. To the extent that these devices are used with towed vehicles requiring an electrical interface to the aircraft, electrical transfer mechanisms similar to that previously discussed with regard to the Brum reference, i.e. slip rings, are typically incorporated into these devices for purposes of conducting electrical data transfer.

Though the unidirectional and bi-directional reeling devices are operable to pay out the towed vehicle at a controlled rate, the use of slip rings for data transmission purposes does not lend itself to the use of tow lines incorporating fiber optics. Thus, the aforementioned reeling devices are not typically able to provide the enhanced data transmission capabilities facilitated by a fiber optic link. Such reeling devices also require high amounts of maintenance to insure the proper functioning of the braking mechanisms. Additionally, the use of such reeling devices necessitates the permanent affixation of a spool and brake assembly to the aircraft.

SUMMARY OF THE INVENTION

The present invention is specifically directed toward meeting the aforementioned shortcomings in towed vehicle deployment systems. In the present invention, the tow line is fixed at both the aircraft and towed vehicle ends of the tow line thereby eliminating the need for slip rings. The tow line is stowed on a bifilar wound spool disposed along the length of the tow line such that the aircraft and towed vehicle ends of the tow line are simultaneously unwound during payout. The towed vehicle and the spool are deployed simultaneously and the spool, by nature of its wrapping, assumes a position between the aircraft and the towed vehicle. The spool provides an aerodynamic braking force during payout to deploy the towed vehicle at a controlled rate within system parameters to insure that at full payout, the tensile load applied to the tow line is sufficiently small to prevent tow line failure. At the end of the payout, the spool disengages itself from the tow line and propels itself away from the tow line and clear of the towed vehicle.

More particularly, in accordance with a preferred embodiment of the present invention, there is provided an aerodynamically braked towed vehicle deployment device which generally comprises a spool member. The spool member itself comprises a sleeve portion having a first end and a second end. Formed adjacent the first end of the sleeve portion is a first laterally extending flange portion which defines a generally planar first outer surface, while formed adjacent the second end of the sleeve portion is a second laterally extending flange portion which defines a generally planar second outer surface. A length of cable (i.e. the tow line) is bifilar wound about the sleeve portion of the spool in a manner wherein the first end is attached to an aircraft and the second end is attached to the towed vehicle.

The spool member includes aerodynamic brake means associated therewith which are operable to control the rotational speed of the spool and thereby control the deployment of a towed vehicle behind the aircraft. The brake means comprise a first air foil member which is attached to the first outer surface of the first flange portion and a second air foil member which is attached to the second outer surface of the second flange portion. The first air foil member includes a first set of blade members disposed about the periphery thereof, while the second air foil includes a second set of blade members disposed about the periphery thereof. Importantly, the first set of blade members and the second set of blade members are sized and configured in a manner such that air impinging the first air foil member and the second air foil member during the deployment of the towed vehicle will slow the rotational speed of the spool member. The first air foil member further includes a first guide member attached thereto in a manner wherein the first guide member interconnects the distal ends of the first set of blade members. Similarly, the second air foil member further includes a second guide member attached thereto in the same manner as previously described with respect to the first guide member. The first guide member and the second guide member are operable to control the positioning of the tow line while the tow line is being unwound from the spool member during the towed vehicle deployment. In the preferred embodiment, both the spool member and the first and second air foil members attached thereto are configured in a manner operable to disengage the deployment device from the tow line when the towed vehicle is fully deployed.

The tow line itself preferably includes a fiber optic core which is adapted to transmit signals between the towed vehicle and the aircraft. Advantageously, the bifilar winding of the tow line about the spool member is adapted to simultaneously deploy the towed vehicle and the deployment device and to maintain the deployment device in a position typically equidistantly spaced between the towed vehicle and the aircraft while the towed vehicle is being deployed. The sleeve portion includes a groove formed therein which is adapted to receive a portion of the tow line in a manner operable to initiate the bifilar winding of the tow line about the spool member. In the preferred embodiment, the deployment device is constructed from aluminum.

It is an object of the present invention to provide a vehicle deployment device adapted to deploy a towed vehicle at a controlled rate of speed.

Another object of the present invention is to provide a towed vehicle deployment device having enhanced electronic data transmission capabilities.

Another object of the present invention is to provide a towed vehicle deployment device which is disposable and eliminates the need for the permanent attachment of a deployment mechanism to the aircraft or to the towed vehicle.

BRIEF DESCRIPTION OF THE DRAWINGS

These as well as other features of the present invention will become apparent upon reference to the drawings wherein:

FIG. 4 is a partial perspective view illustrating the manner in which the tow line is bifilar wound about the spool of the present invention;

FIG. 5 is a partial perspective view illustrating the manner in which a blade member and guide member of an air foil member are interfaced;

FIG. 6 is a side view illustrating the rotational direction of the spool member of the present invention when interfaced to the tow line during the payout of the towed vehicle; and FIG. 7 is a side view illustrating the manner in which the vehicle deployment device of the present invention is disengaged and thus ejected from a tow line after the towed vehicle has been fully deployed.

DETAILED DESCRIPTION OF THE PREFERRED EMBODIMENT

Figure 1:
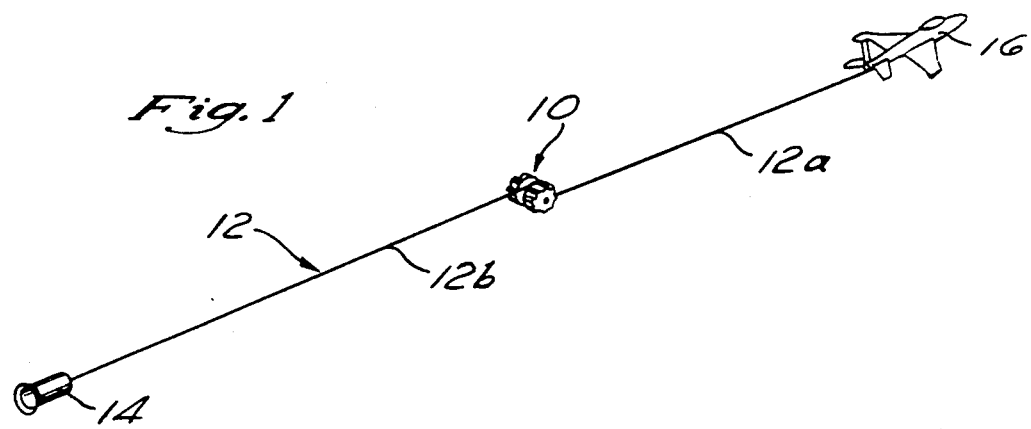
FIG. 1 is a perspective view of the vehicle deployment device of the present invention as positioned during the payout of a towed vehicle behind an aircraft.

Referring now to the drawings wherein the showings are for purposes of illustrating a preferred embodiment of the present invention only, and not for purposes of limiting the same, FIG. 1 perspectively illustrates the aerodynamically braked vehicle deployment device 10 of the present invention as positioned on a tow line 12 as a towed vehicle 14 is being payed out behind an aircraft 16. Towed vehicle 14 as used with deployment device 10 is typically a sacrificial towed vehicle such as an aerial target or a decoy. Thus, towed vehicle 14 is intended to be released from aircraft 16 as opposed to being reeled back toward aircraft 16. Additionally, towed vehicle 14 will typically be of a variety incorporating electronic devices and circuitry therein. As such, tow line 12 is adapted to transmit electrical data from aircraft 16 to towed vehicle 14. In the preferred embodiment, tow line 12 has a fiber optic core to facilitate such data transmission. However, more conventional electrical data transmission systems such as metal conductors are also contemplated. The inclusion of a fiber optic core within tow line 12 enhances the electrical data transmission capabilities between the aircraft 16 and the towed vehicle 14 by increasing the amount of data that may be transmitted through tow line 12 as well as increasing the speed at which such data is transmitted. Additionally, the fiber optic communications link is not susceptible to RF (radio frequency) interference as are other types of conducting/transmission materials. It will be appreciated, however, that towed vehicle 14 need not necessarily incorporate electrical devices therein, and that tow line 12 may be constructed in a manner so as not to include any electrical conducting capabilities.

Figure 2:
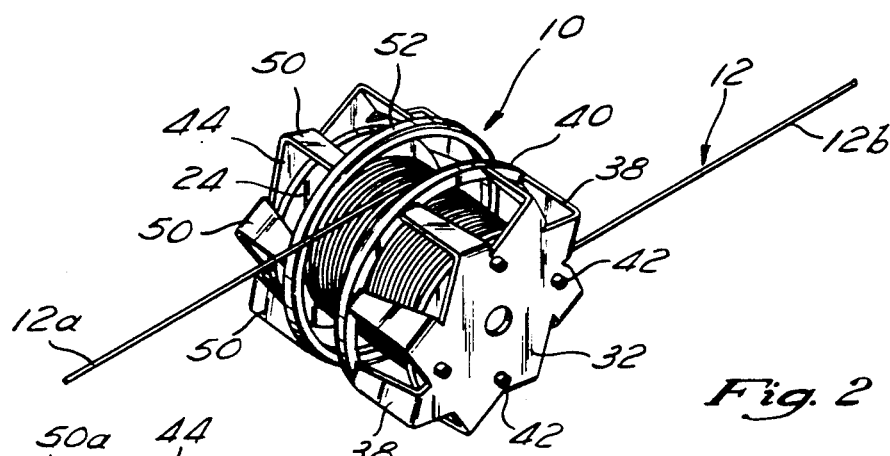
FIG. 2 is perspective view of the present invention as interfaced to the tow line.
Figure 3:
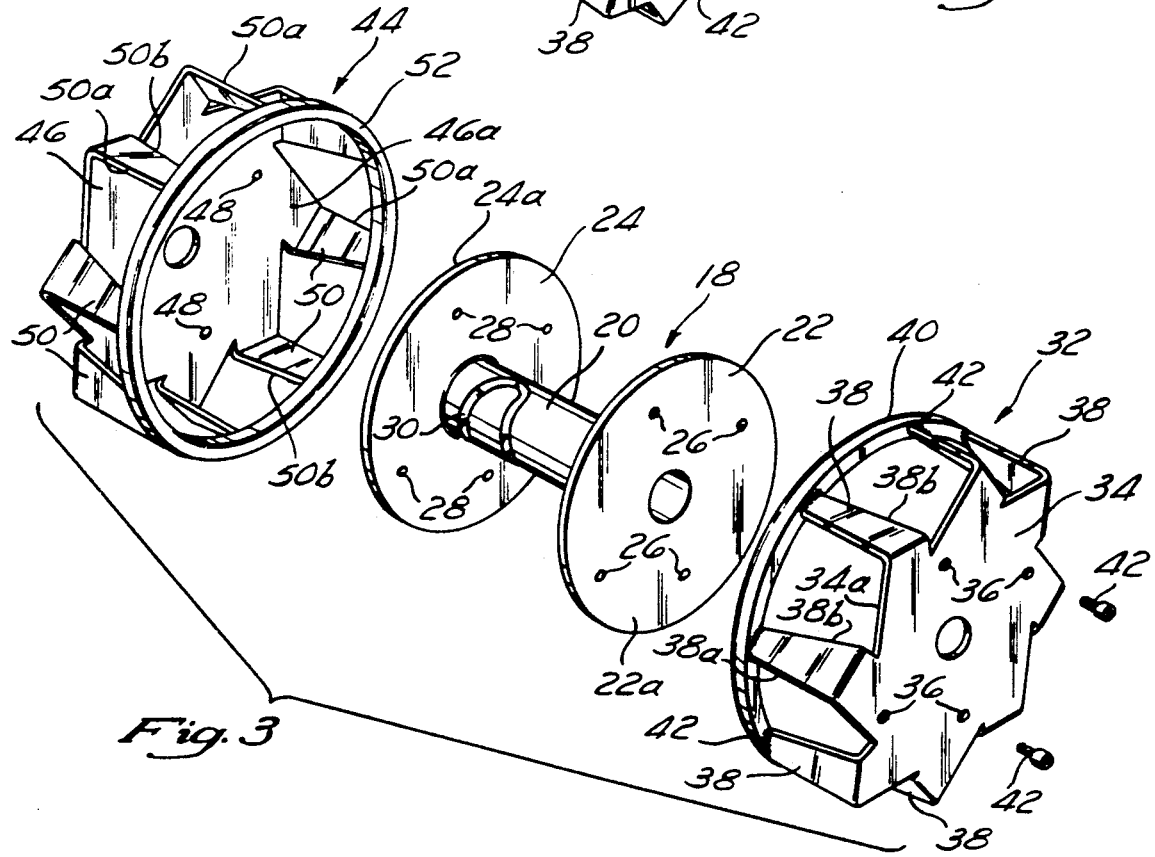
FIG. 3 is an exploded view illustrating the components comprising the present invention.

Referring now to FIGS. 2 and 3, the deployment device 10 generally comprises a spool member 18. As will be discussed in greater detail below, the tow line 12 is bifilar wound about the spool member 18 in a manner wherein the first end of tow line 12 is attached to aircraft 16 while the second end is attached to towed vehicle 14. Since the tow line 12 is fixed at both the aircraft and towed vehicle ends of the tow line 12, the need for slip rings or other devices to facilitate any desired electrical data transmission between the aircraft 16 and the towed vehicle 14 is eliminated. Additionally, on the basis of the tow line 12 being bifilar wound about the spool member 18, the ends of the tow line 12 attached to the towed vehicle 14 and aircraft 16 are simultaneously unwound during payout. Since the towed vehicle 14 and deployment device 10 are deployed simultaneously, by nature of the bifilar winding of the tow line 12 about the spool member 18, the deployment system 10 assumes a position between the aircraft 16 and towed vehicle 14 during payout of the towed vehicle 14.

Referring now to FIGS. 3 and 4, spool member 18 generally comprises a sleeve portion 20 having a first end and a second end. Formed, adjacent the first end of sleeve portion 20 is a first laterally extending flange portion 22 defining a first outer surface 22a, while formed adjacent the second end of sleeve portion 20 is a second laterally extending flange portion 24 defining a second outer surface 24a. Disposed within first flange portion 22 are a first set of apertures 26. Additionally, disposed within second flange portion 24 are a second set of apertures 28 each of which are in coaxial alignment with the apertures comprising first set 26. Formed within the outer surface of sleeve portion 20 is a groove 30. As seen in FIG. 4, groove 30 is adapted to receive a portion of tow line 12 in a manner operable to initiate the bifilar winding of tow line 12 about sleeve portion 20.

Attached to first flange portion 22 of spool member 18 is a first air foil member 32 which is preferably formed in a cup-like configuration. The first airfoil member includes a first planar portion 34 having an inner surface 34a. Disposed within first planar portion 34 is a first set of apertures 36 which are positioned therein in a configuration identical to the configuration in which the first set of apertures 26 are disposed within first flange portion 22. First air foil member 32 further includes a plurality of aerodynamic blade members 38 disposed about the periphery of first planar portion 34. Each of blade members 38 defines a leading edge 38a and a trailing edge 38b and extends approximately perpendicularly relative to inner surface 34a of first planar portion 34. Attached to and interconnecting the distal ends of each of blade members 38 is a first annular guide member 40. Referring now to FIG. 5, in the preferred embodiment of the present invention, blade members 38 are attached to first guide member 40 by a weld 42. It will be appreciated however that other attachment methods may be utilized as an alternative to a welding operation. The use of first guide member 40 will be explained in greater detail below. First air foil member 32 is attached to spool member 18 through the abutment of inner surface 34a of first planar portion 34 against first outer surface 22a of first flange portion 22 in a manner wherein apertures 36 are in coaxial alignment with apertures 26. After apertures 36 and apertures 26 are aligned, a plurality of fasteners such as screws 42 are inserted therethrough thereby securing first air foil member 32 to spool member 18.

Also attached to spool member 18 is second air foil member 44 which has a configuration identical to first air foil member 32. In this respect, second air foil member 44 defines a second planar portion 46 having an inner surface 46a. Disposed within second planar portion 46 is a second set of apertures 48 which are positioned therein in a configuration identical to the configuration in which the second set of apertures 28 are disposed within second flange portion 24. Additionally, disposed about the periphery of second planar portion 46 are a plurality of blade members 50. Like blade members 38, blade members 50 each define leading edges 50a and trailing edges 50b and extend perpendicularly relative to inner surface 46a of second planar portion 46. Second air foil member 44 also includes a second annular guide member 52 attached to and interconnecting the distal ends of blade members 50 in the same manner as previously described with respect to the attachment of guide member 40 to blade members 38. Second air foil member 44 is attached to spool member 18 through the abutment of inner surface 46a of second planar portion 46 against second outer surface 24a of second flange portion 24 in a manner wherein apertures 48 and apertures 28 are in coaxial alignment. Screw fasteners 42 are then inserted into the coaxially aligned apertures 48 and apertures 28 thereby securing second air foil member 44 to spool member 18.

As best seen in FIG. 2, when first air foil member 32 and second air foil member 44 are attached to spool member 18, first guide member 40 and second guide member 52 are positioned over sleeve portion 20 of spool member 18 and separated by a distance substantially less than the distance separating first flange portion 22 from second flange portion 24. In this orientation, first guide member 40 and second guide member 52 are adapted to control the positioning of tow line 12 as tow line 12 is being unwound (i.e. payout) from spool member 18 during the deployment of towed vehicle 14.

Having thus described the components of deployment device 10, the operation thereof will now be discussed. Initially, the tow line 12 is preferably folded in half and the loop formed by the fold is inserted into groove 30 as seen in FIG. 4. As tow line 12 is being wound about sleeve portion 20, it is constantly moved from side to side between first flange portion 22 and second flange portion 24 so as to maintain an even distribution of tow line 12 windings about sleeve portion 22. After the winding operation has been completed, one end of tow line 12 is extended over the winds on the spool and is attached to towed vehicle 14 while the other end is extended under the winds on the spool at a 180 degree orientation to the first end and is attached to aircraft 16. After the aircraft 16 is in flight, the deployment device 10 and towed vehicle 14 are simultaneously ejected from the aircraft 16. The velocity of aircraft 16 in conjunction with the drag exerted on towed vehicle 14 causes towed vehicle 14 to be payed out behind aircraft 16.

Referring now to FIG. 6, as previously specified, the bifilar winding of tow line 12 about sleeve portion 20 of spool member 18 causes the opposed ends of the tow line 12 to be simultaneously unwound during payout of the towed vehicle 14 behind aircraft 16. Thus, since deployment device 10 is only attached to tow line 12, the payout of towed vehicle 14 will cause the spool member 18 to rotate in the direction designated in FIG. 6. During payout of the tow line the annular guide members 40 and 52 serve to form guide surfaces which insure that the tow line will not become tangled or contact the air foil blade members 38 and 50 which could sever the tow line. Guide members 40 and 52 also serve to maintain the axis of rotation approximately perpendicular to the tow line thereby maintaining the air foils 32 and 44 approximately perpendicular to the air flow where they can act most effectively. In using deployment device 10 of the present invention, end 12a of tow line 12 is affixed to the aircraft 16 while end 12b of tow line 12 is affixed to the towed vehicle 14. As can be appreciated, the rotation of the deployment device 10 in this particular direction indicated in FIG. 6 allows the direction of the air flow designated by the arrow A in FIG. 6 to impinge against the leading edges 38a, 50a of blade members 38, 50, respectively at greater relative velocity than which the same air flow "A" impinges on the trailing edges of 38b and, 50b on the opposite sides of blade members 38, 50. This impingement of air against the leading edges 38a, 50a of blade members 38, 50 generates a counter-rotational force upon the spool member 18 which opposes the rotation of the spool thereby controlling the rate at which spool member 18 rotates and thereby slowing the deployment of towed vehicle 14 behind aircraft 16. Additionally, due to the bifilar winding of tow line 12 about spool member 18, after towed vehicle 14 has been fully deployed, tow line 12 is released from within groove 30 and thus disengaged from spool member 18. Though the rotation of spool member 18 is slowed by the impingement of air against blade members 38, 50, the rotation of spool member 18 at disengagement is still of a speed sufficient to propel the deployment device 10 away from the tow line 12 in the manner shown in FIG. 7. This disengagement technique is operable to clear the deployment device 10 away from towed vehicle 14 thereby preventing any possible damage thereto. The lift generated by the rotating deployment device 10 will propel it away from the tow line 12 only if it is wound so that the tow line 12, when fully unwound, is on the side of the deployment device 10 that is rotating with the air flow "A" as shown in FIG. 7. In the preferred embodiment, deployment device 10 is constructed from aluminum, though it will be appreciated that other materials may be utilized as an alternative.

Further, it will be recognized that by forming the air foil members to posses differing aerodynamic capability, the rotational speed of the spool during deployment can be modified to accommodate high speed or low speed towed vehicle deployment applications.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A towed vehicle deployment device for use upon a tow line extending between a towed vehicle and an aircraft comprising:
    a spool adapted to store a length of tow line in bifilar winding thereupon and payout said length of tow line during rotational movement caused by drag forces exerted upon the towed vehicle; and
    aerodynamic brake means formed upon said spool to generate a counter-rotational force upon said spool during payout of said length of tow line.

2. The towed vehicle deployment device of claim 1 wherein said brake means comprises a pair of air foil members attached to said spool.

3. The towed vehicle deployment device of claim 2 further comprising means for guiding the payout of said length of tow line from said spool.

4. The towed vehicle deployment device of claim 3 wherein said guiding means comprises an annular guide surface formed on each of said pair of air foil members.

5. The towed vehicle deployment device of claim 4 wherein said pair of air foil members are formed in a cup-like configuration.

6. The towed vehicle deployment device of claim 1 wherein said spool member includes a tow line recess adapted to receive a portion of said length of tow line.

7. An aerodynamically braked vehicle deployment device comprising:
    a spool member;
    a braking means associated with said spool member, said braking means being operable to slow the deployment of said towed vehicle behind said aircraft, said spool member and said braking means being configured in a manner wherein said deployment device is propelled away from a tow line when said towed vehicle is fully deployed;
    said tow line having a first end and a second end, and being bifilar wound about said spool member in a manner wherein said first end is attached to an aircraft and said second end is attached to a towed vehicle.

8. The device of claim 7 wherein said spool member comprises:
    a sleeve portion having a first end and a second end;
    a first laterally extending flange portion adjacent said first end of said sleeve portion, said first flange portion having a first outer surface; and
    a second laterally extending flange portion adjacent said second end of said sleeve portion, said second flange portion having a second outer surface.

9. The device of claim 8 wherein said braking means comprises:
    a first air foil member attached to said first outer surface, said first air foil member including a first set of blade members disposed about the periphery thereof; and
    a second air foil member attached to said second outer surface, said second air foil member including a second set of blade members disposed about the periphery thereof;
    said first set of blade members and said second set of blade members being sized and configured in a manner such that air impinging said first air foil member and said second air foil member will slow the rotation of said spool member while said towed vehicle is being deployed.

10. The device of claim 9 wherein said first air foil member further includes a first guide member attached thereto and said second air foil member further includes a second guide member attached thereto, said first guide member and said second guide member being operable to control the positioning of said tow line while said tow line is being unwound from said spool member.

11. The device of claim 10 wherein said deployment device is constructed from aluminum.

12. The device of claim 8 wherein the bifilar winding of said tow line about said spool member is adapted to simultaneously deploy said towed vehicle and said deployment device behind said aircraft in a manner operable to maintain said deployment device in a position equidistant spaced between said towed vehicle and said aircraft and to cause said spool member to rotate while said towed vehicle is being deployed.

13. The device of claim 12 wherein said spool member and said braking means are sized and configured such that the torque created by the rotation of said spool member will cause said deployment device to be thrust away from said tow line after said towed vehicle is fully deployed.

14. The device of claim 13 wherein said sleeve portion includes a groove formed therein, said groove being adapted to receive a portion of said tow line in a manner operable to initiate the bifilar winding of said tow line about said spool member.

15. The device of claim 7 wherein said tow line includes a fiber optic core adapted to transmit signals between said towed vehicle and said aircraft.

* * * * *